United States Patent
Kim et al.

(10) Patent No.: US 9,876,874 B2
(45) Date of Patent: Jan. 23, 2018

(54) NETWORK SELECTING APPARATUS AND OPERATING METHOD THEREOF

(71) Applicant: Electronics and Telecommunications Research Institute, Daejeon (KR)

(72) Inventors: Chei-Yol Kim, Daejeon (KR); Sang-Min Lee, Daejeon (KR); Jeong-Sook Park, Daejeon (KR); Young-Chang Kim, Daejeon (KR); Soo-Young Kim, Cheongju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 445 days.

(21) Appl. No.: 14/257,289

(22) Filed: Apr. 21, 2014

(65) Prior Publication Data

US 2014/0324951 A1    Oct. 30, 2014

(30) Foreign Application Priority Data

Apr. 29, 2013 (KR) .................... 10-2013-0047656

(51) Int. Cl.
*H04L 29/08* (2006.01)

(52) U.S. Cl.
CPC ...... *H04L 67/2852* (2013.01); *H04L 67/1097* (2013.01)

(58) Field of Classification Search
CPC . H04L 67/2842; H04L 67/1002; H04L 67/02; H04L 67/2823; H04L 67/34; H04L 67/10; H04L 67/101; H04L 67/2852; H04L 67/1014; H04L 67/16; H04L 67/289; H04L 69/329; H04L 63/0272; H04L 63/10; G06F 17/30902; G06F 12/0813; G06F 21/10; G06F 8/65; G06F 11/1666; G06F 12/0815; G06F 3/067
USPC ....... 709/203, 223, 218, 219, 213, 224, 226, 709/217, 227; 711/E17.12, 118, 113
See application file for complete search history.

(56) References Cited

U.S. PATENT DOCUMENTS

| 7,944,812 B2 | 5/2011 | Carlson et al. |
| 8,145,614 B1 | 3/2012 | Zimran et al. |

(Continued)

FOREIGN PATENT DOCUMENTS

| KR | 10-2010-0069316 | 6/2010 |
| KR | 10-2011-0086820 | 8/2011 |

(Continued)

*Primary Examiner* — Patrice Winder
*Assistant Examiner* — Abderrahmen Chouat
(74) *Attorney, Agent, or Firm* — Staas & Halsey LLP

(57) ABSTRACT

Disclosed herein is a network selecting apparatus including: a determining unit checking an operation state of a cache server in which replicated data corresponding to a data request signal are stored and determining whether the cache server is normally operated, when the data request signal is received from a client; and a selecting unit selecting a first network so that the replicated data are transmitted to input and output devices when the cache server is normally operated and selecting a second network so that original data corresponding to the data request signal are transmitted from a storage server in which the original data are stored to the input and output devices when the cache server is not normally operated.

10 Claims, 3 Drawing Sheets

(56) References Cited

U.S. PATENT DOCUMENTS

| | | | | |
|---|---|---|---|---|
| 2006/0259686 | A1* | 11/2006 | Sonobe | G06F 3/0607 711/114 |
| 2008/0155082 | A1* | 6/2008 | Ohtani | H04L 67/2842 709/223 |
| 2012/0278382 | A1* | 11/2012 | Faith | G06F 3/064 709/203 |
| 2014/0082128 | A1* | 3/2014 | Beard | H04L 29/08549 709/216 |
| 2014/0173130 | A1* | 6/2014 | Uluderya | H04L 45/70 709/238 |

FOREIGN PATENT DOCUMENTS

| | | |
|---|---|---|
| KR | 10-2011-0129163 | 12/2011 |
| KR | 10-2006-0124402 | 12/2012 |

* cited by examiner

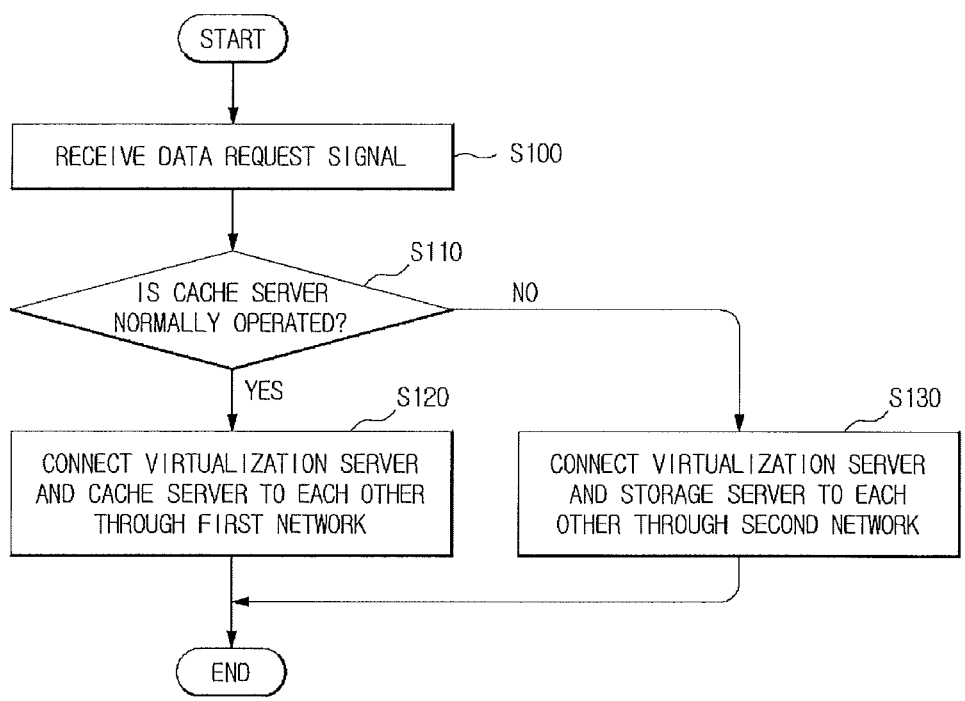

NETWORK SELECTING APPARATUS AND OPERATING METHOD THEREOF

CROSS REFERENCE TO RELATED APPLICATION

This application claims the benefit of Korean Patent Application No. 10-2013-0047656, filed on Apr. 29, 2013, entitled "Network Selecting Apparatus and Operating Method Thereof", which is hereby incorporated by reference in its entirety into this application.

BACKGROUND OF THE INVENTION

1. Technical Field

The present invention relates to a network selecting apparatus and an operating method thereof, and more particularly, to a network selecting apparatus capable of easily providing a virtual desktop service through different networks depending on an operation state of a cache server, and an operating method thereof.

2. Description of the Related Art

Generally, a plurality of client (service nodes) are connected to a single cache server through a storage network, and the cache server is connected to a distributed file system server including a plurality of storage servers through a general network.

Here, the clients are also connected to the general network for a virtual desktop service.

Inputs and outputs of the clients are supported by the storage network connected to the cache server, and the clients are communicated through the general network.

However, in the case in which inputs and outputs of the plurality of clients are transmitted to the cache server, when a fault occurs in the cache server or the cache server is not normally operated, fault may occur in inputs from the cache server to the plurality of clients and outputs from the plurality of clients to the cache server.

Recently, research into a technology of providing a stable virtual desktop service to the plurality of clients in spite of the fault of the cache server has been conducted.

SUMMARY OF THE INVENTION

An object of the invention is to provide a network selecting apparatus capable of easily providing a virtual desktop service by selecting input and output paths through different networks depending on an operation state of a cache server, and an operating method thereof.

According to an exemplary embodiment of the present invention, there is provided a network selecting apparatus including: a determining unit checking an operation state of a cache server in which replicated data corresponding to a data request signal are stored and determining whether the cache server is normally operated, when the data request signal is received from a client; and a selecting unit selecting a first network so that the replicated data are transmitted to input and output devices when the cache server is normally operated and selecting a second network so that original data corresponding to the data request signal are transmitted from a storage server in which the original data are stored to the input and output devices when the cache server is not normally operated.

According to another exemplary embodiment of the present invention, there is provided an operating method of a network selecting apparatus, including: receiving a data request signal from a client; checking an operation state of a cache server in which replicated data corresponding to the data request signal are stored to determine whether the cache server is normally operated; and selecting a first network so that the replicated data are transmitted to input and output devices when the cache server is normally operated and selecting a second network so that original data corresponding to the data request signal are transmitted from a storage server in which the original data are stored to the input and output devices when the cache server is not normally operated.

BRIEF DESCRIPTION OF THE DRAWINGS

FIG. 3 is a flow chart illustrating an operating method of the network selecting apparatus according to an exemplary embodiment of the present invention.

DESCRIPTION OF EXEMPLARY EMBODIMENTS

Figure 1:
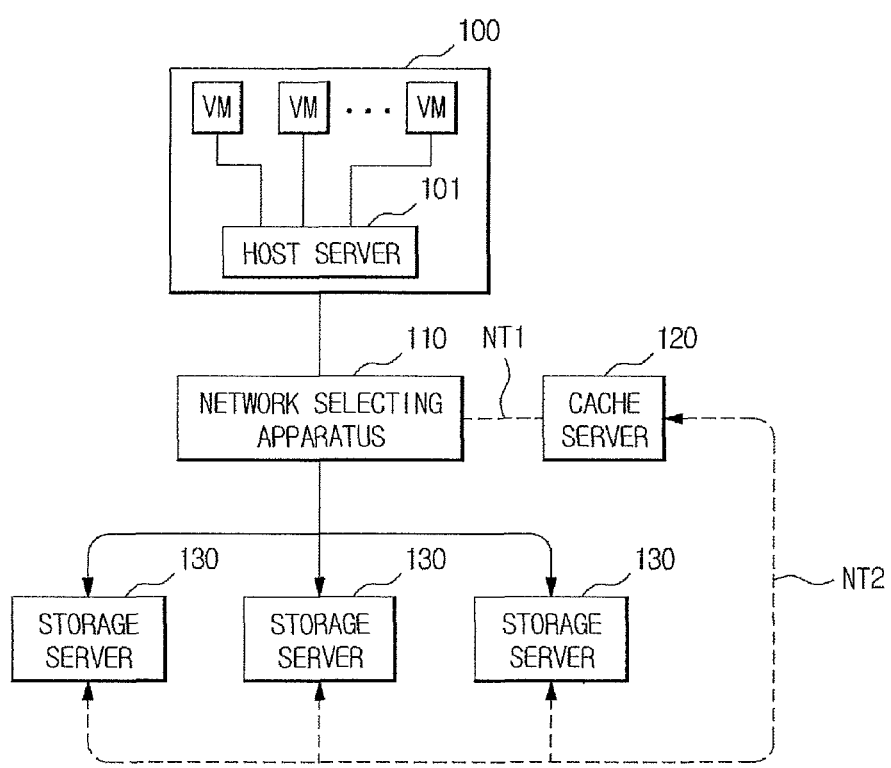
FIG. 1 is a diagram schematically illustrating a network system including a network selecting apparatus according to an exemplary embodiment of the present invention.

Hereinafter, exemplary embodiments of the present invention will be described in detail with reference to the accompanying drawings. First, it is to be noted that in giving reference numerals to components of each of the accompanying drawings, the same components will be denoted by the same reference numerals even though they are illustrated in different drawings. Further, in describing exemplary embodiments of the present invention, well-known functions or constructions will not be described in detail since they may unnecessarily obscure the understanding of the present invention. In addition, although exemplary embodiments of the present invention will be described below, the scope of the present invention is not limited thereto, but may be variously modified by those skilled in the art.

Referring to FIG. 1, a network system may be configured to include a virtualization server 100, a network selecting apparatus 110, a cache server 120, and storage servers 130.

The virtualization server 100 includes a host server 101 providing a virtual desktop service to a plurality of clients and a plurality of input and output devices.

Although the case in which the number of virtualization servers 100 is one has been described in an exemplary embodiment of the present invention, the number of virtualization servers 100 may be plural, but is not limited thereto.

Here, the plurality of clients may be a virtual machine or a physical component, but is not limited thereto.

The host server 101 may provide the virtual desktop service using the plurality of clients (or client VMs) and may include a hypervisor for supporting an operation of the plurality of clients.

Here, the hypervisor may be software controlling access methods of different operating systems in various computer resources such as a processor or a memory.

The host server 101 may transmit a data request signal requested from the plurality of client VMs to the network selecting apparatus 110. Here, the data request signal may be a request signal for reading or writing of any replicated data stored in the cache server 120.

When the data request signal is transmitted from the virtualization server 100, the network selecting apparatus 110 may check a current operation state of the cache server 120 and select a first network NT1 between the virtualization server 100 and the cache server 120 or a second network NT2 between the virtualization server 100 and the storage server 130.

That is, the network selecting apparatus 110 may select the first network NT1 between the virtualization server 100 and the cache server 120 when it is determined that the cache server 120 is normally operated, thereby selecting a network path so that data communication is possible between the virtualization server 100 and the cache server 120.

Here, the first network NT1 may be a high speed storage area network based on any one of a small computer system interface (SCSI) protocol, an Internet small computer system interface (iSCSI) protocol, a fiber channel (FC) protocol, and a fiber channel over Ethernet (FCoE) protocol.

In addition, the network selecting apparatus 110 may select the second network NT2 between the virtualization server 100 and the storage server 130 when it is determined that the cache server 120 is not normally operated, thereby selecting a network path so that data communication is possible between the virtualization server 100 and the storage server 130.

The second network NT2 may be a general network, such as Ethernet.

A detailed description of the above-mentioned network selecting apparatus 110 will be provided below.

When the network selecting apparatus 110 selects the first network NT1, the cache server 120 may transmit stored replicated data to the virtualization server 100 through the first network NT1 according to the data request signal transmitted from the virtualization server 100.

Here, the cache server 120 may be connected to the storage server 130 through the second network NT2, and may cache original data stored in the storage server 130 and transmit the cached data to the virtualization server 100 in the case in which the replicated data corresponding to the data request signal transmitted from the virtualization server 100 are stored therein.

When the network selecting apparatus 110 selects the second network NT2, the storage server 130 may transmit stored original data to the virtualization server 100 through the second network NT2 according to the data request signal transmitted from the virtualization server 100.

In addition, the storage server 130 may transmit the original data to the cache server 120, as described above.

Figure 2:
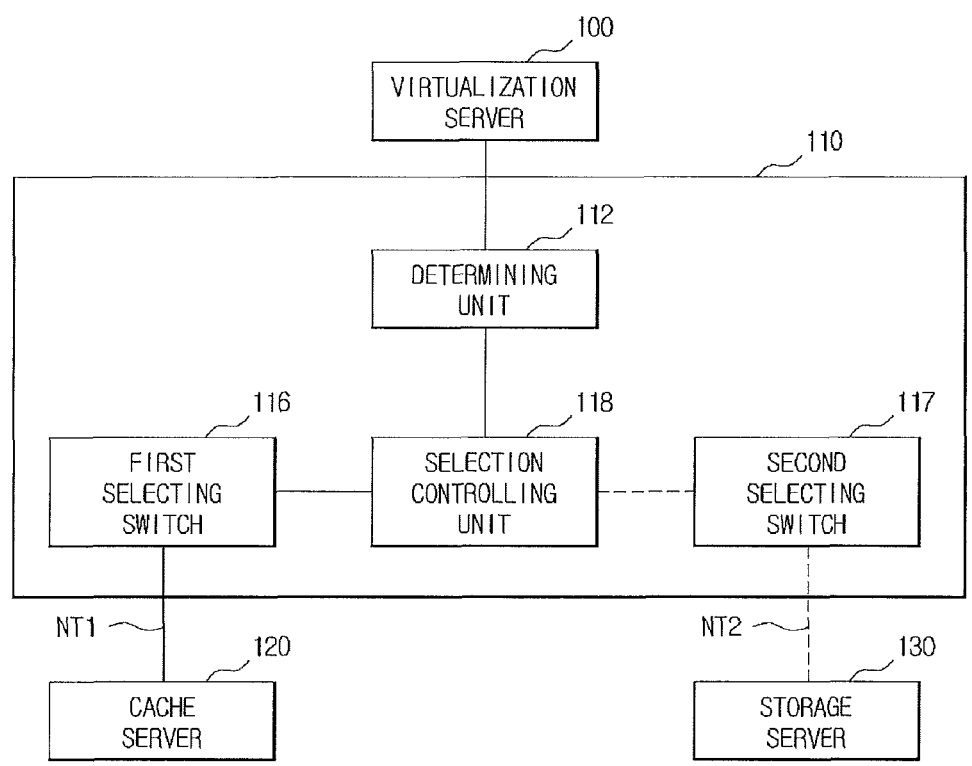
FIG. 2 is a block diagram illustrating control components of the network selecting apparatus according to an exemplary embodiment of the present invention.

FIG. 2 is a block diagram illustrating control components of the network selecting apparatus according to an exemplary embodiment of the present invention.

Referring to FIG. 2, the network selecting apparatus 110 may include a determining unit 112 and a selecting unit (not illustrated).

Here, the determining unit 112 receives the data request signal transmitted from the virtualization server 100, and checks an operation state of the cache server 120 and determines whether the cache server 120 is normally operated at the time of receiving the data request signal.

The determining unit 112 may check an input data load and an output data load of the cache server 120 and determine that the cache server is not normally operated when a ratio of the output data load to the input data load is lower than a set reference data load. Although the case in which the determining unit 112 determines the operation state of the cache server 120 by the input and output data loads of the cache server 120 has been described in an exemplary embodiment of the present invention, a method of determining the operation stage of the cache server 120 is not limited thereto. For example, the operation state of the cache server 120 may be determined by requesting the cache server 120 to check the operation state thereof and receiving information on the operation state of the cache server 120 checked by the cache server 120 itself. In addition, the determining unit 112 may measure a response time for an I/O request to the cache server and determine that the cache server is not normally operated when the response time exceeds a threshold time.

The selecting unit may include a first selecting switch 116 selecting the first network NT1 between the virtualization server 100 and the cache server 120, a second selecting switch 117 selecting the second network NT2 between the virtualization server 100 and the storage server 130, and a selection controlling unit 118 operating any one of the first and second selecting switches 116 and 117 depending on a judgment of the determining unit 112.

In an exemplary embodiment of the present invention, the first and second selecting switches 116 and 117 may be physical switches or logical switches and may be formed as one selecting switch to select any one of the first and second networks NT1 and NT2, but is not limited thereto.

When it is determined by the determining unit 112 that the cache server 120 is normally operated, the selection controlling unit 118 may perform a switching operation on the first selecting switch 116 to allow the data request signal and the replicated data corresponding to the data request signal to be transmitted between the virtualization server 100 and the cache server 120 through the first network NT1.

In addition, when it is determined by the determining unit 112 that the cache server 120 is not normally operated, the selection controlling unit 118 may perform a switching operation on the second selecting switch 117 to allow the data request signal and the original data corresponding to the data request signal to be transmitted between the virtualization server 100 and the storage server 130 through the second network NT2.

As described above, when the data request signal is received from the virtualization server 100, the selecting unit primarily determines the operation state of the cache server 120 and selects multiple input and output paths so that the replicated data or the original data corresponding to the data request signal transmitted by the virtualization server 100 are stably transmitted, thereby making it possible to improve performance for a virtual desktop service.

FIG. 3 is a flow chart illustrating an operating method of the network selecting apparatus according to an exemplary embodiment of the present invention.

Referring to FIG. 3, the network selecting apparatus 110 checks the operation state of the cache server 120 and determines whether the cache server 120 is normally operated (S110) when the data request signal is received from the virtualization server 100 (S100).

That is, the determining unit 112 receives the data request signal transmitted from the virtualization server 100, and checks the operation state of the cache server 120 and determines whether the cache server 120 is normally operated at the time of receiving the data request signal.

The determining unit 112 may check the input data load and the output data load of the cache server 120 and judge that the cache server is not normally operated when the ratio of the output data load to the input data load is lower than the set reference data load. In addition, the determining unit 112 may measure a response time for an I/O request to the cache server and determine that the cache server is not normally operated when the response time exceeds a threshold time. In the case in which it is determined in S110 that the cache server 120 is normally operated, the network selecting apparatus 110 selects the first network NT1 between the virtualization server 100 and the cache server 120 to transmit the data request signal and the replicated data corresponding to the data request signal through the first network (NT1) (S120), and in the case in which it is determined in S110 that the cache server 120 is not normally operated, the network selecting apparatus 110 selects the second network NT2 between the virtualization server 100 and the storage server 130 to transmit the data request signal and the original signal corresponding to the data request signal through the second network NT2 (S130).

That is, when it is determined by the determining unit 112 that the cache server 120 is normally operated, the selection controlling unit 118 may perform the switching operation on the first selecting switch 116 to allow the data request signal and the replicated data corresponding to the data request signal to be transmitted between the virtualization server 100 and the cache server 120 through the first network NT1.

In addition, when it is determined by the determining unit 112 that the cache server 120 is not normally operated, the selection controlling unit 118 may perform the switching operation on the second selecting switch 117 to allow the data request signal and the original data corresponding to the data request signal to be transmitted between the virtualization server 100 and the storage server 130 through the second network NT2.

As described above, when the data request signal is received from the virtualization server 100, the selecting unit primarily determines the operation state of the cache server 120 and selects multiple input and output paths so that the replicated data or the original data corresponding to the data request signal transmitted by the virtualization server 100 are stably transmitted, thereby making it possible to improve performance for a virtual desktop service.

In a network selecting apparatus and an operating method thereof according to an exemplary embodiment of the present invention, when the data request signal is received from the client, the operation state of the cache server connected to the storage network is checked, and the stored replicated data are transmitted to the input and output device according to the data request signal when the cache server is normally operated and the stored original data are transmitted to the input and output devices through the storage server connected to a general network according to the data request signal when the cache server is not normally operated, such that communication to the storage server through multiple input and output paths, that is, a general network, is performed even when the cache server is not normal operated or a fault occurs in the cache server, thereby making it possible to provide a virtual desktop service to the input and output devices and improve availability of the client.

Although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. In addition, the computer program as described above may be stored in computer readable media such as a universal serial bus (USB) memory, a compact disk (CD), a flash memory, or the like, and be read and executed by a computer to implement the exemplary embodiment of the present invention. An example of the computer readable media may include magnetic recording media, optical recording media, carrier wave media, and the like.

In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

The spirit of the present invention has been described by way of example hereinabove, and the present invention may be variously modified, altered, and substituted by those skilled in the art to which the present invention pertains without departing from essential features of the present invention. Accordingly, the exemplary embodiments disclosed in the present invention and the accompanying drawings do not limit but describe the spirit of the present invention, and the scope of the present invention is not limited by the exemplary embodiments and accompanying drawings. The scope of the present invention should be interpreted by the following claims and it should be interpreted that all spirits equivalent to the following claims fall within the scope of the present invention.

What is claimed is:

1. A network selecting apparatus to transmit an input and output (I/O) of a client device, the apparatus comprising:
at least one hardware processor to:
communicably couple, through a plurality of types of networks, to a storage server storing data corresponding to a data request signal for the I/O of the client device, and to a cache server storing replicated data of the data stored in the storage server, and
implement functions of a determiner and a selector,
the determiner to:
receive the data request signal for the I/O of the client device,
check an operation state of the cache server, in response to the received data request signal, by:
checking at least one of an input data load or an output data load of the cache server, and
measuring a response time for an I/O request to the cache server, and
perform a determination of whether the operation state of the cache server is a normal operating state based on the checked operation state of the cache server; and
the selector comprising:
a first selecting switch to select a first type of network connecting between the client device and the cache server, from among the plurality of types of networks, and
a second selecting switch to select a second type of network connecting between the client device and the storage server, from among the plurality of types of networks, the selector to control:
   the first selecting switch to select to connect to the first type of network to transmit the data request signal to the cache server and to transmit the replicated data stored in the cache server for the I/O of the client device, in response to the determination that the operation state of the cache server is the normal operating state, and
   the second selecting switch to select to connect the second type of network to transmit the data request signal to the storage server and to transmit the data stored in the storage server for the I/O of the client device, in response to the determination that the operation state of the cache server is other than the normal operating state.

2. The network selecting apparatus of claim 1, wherein the determiner is further configured to:
   in response to the checking the input data load and the output data load of the cache server, determine that the operation state of the cache server is other than the normal operating state when a ratio of the output data load to the input data load is lower than a set reference data load.

3. The network selecting apparatus of claim 1, wherein the determiner is further configured to:
   in response to the measuring the response time for the I/O request to the cache server, determine that the operation state of the cache server is other than the normal operating state when the response time for the I/O request exceeds a threshold time for the I/O request.

4. The network selecting apparatus of claim 1, wherein the first type of network is a storage area network.

5. The network selecting apparatus of claim 4, wherein the storage area network is based on any one of a small computer system interface (SCSI) protocol, an Internet small computer system interface (iSCSI) protocol, a fiber channel (FC) protocol, a fiber channel over Ethernet (FCoE) protocol, or any combination thereof.

6. The network selecting apparatus of claim 1, wherein the second type of network is a general network including an Ethernet.

7. The network selecting apparatus of claim 1, wherein the selector further comprises:
   a selection controller to:
      control the first selecting switch so that the first type of network is selected when the operation state of the cache server is normal, and
      control the second selecting switch so that the second type of network is selected when the operation state of the cache server is other than normal.

8. An operating method of a network selecting apparatus communicably couplable, through a plurality of types of networks, to a storage server storing data corresponding to a data request signal from a client device and a cache server storing replicated data of the data stored in the storage server, the method comprising:
   by at least one storage medium to store instructions and at least one hardware processor to execute the instructions to:
   receive the data request signal from the client device;
   check an operation state of the cache server, in response to the received data request signal, by:
      checking at least one of an input data load or an output data load of the cache server, and
      measuring a response time for an I/O request to the cache server;
   perform a determination of whether the operation state of the cache server is a normal operating state based on the checked operation state of the cache server;
   control a first selecting switch to select to connect to a first type of network connecting between the client device and the cache server, to transmit the data request signal to the cache server and to communicate the replicated data stored in the cache server with the client device, in response to the determination that the operation state of the cache server is the normal operating state; and
   control a second selecting switch to select to connect to a second type of network connecting between the client device and the storage server, to transmit the data request signal to the storage server and to communicate the data stored in the storage server with the client device, in response to the determination that the operation state of the cache server is other than normal.

9. The operating method of a network selecting apparatus of claim 8, wherein the determining whether the operation state of the cache server is the normal operating state further comprises:
   in response to the checking the input data load and the output data load of the cache server, determining that the operation state of the cache server is other than the normal operating state when a ratio of the output data load to the input data load is lower than a set reference data load.

10. The operating method of a network selecting apparatus of claim 9, wherein the determining whether the operation state of the cache server is the normal operating state further comprises:
   in response to the measuring the response time for the I/O request to the cache server, determining that the operation state of the cache server is other than the normal operating state when the response time for the I/O request exceeds a threshold time for the I/O request.

* * * * *